(12) United States Patent
Michaelis

(10) Patent No.: US 8,649,493 B2
(45) Date of Patent: Feb. 11, 2014

(54) LATENCY COMPENSATION ADJUNCT FOR TELECONFERENCE VOICE SWITCHES

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 286 days.

(21) Appl. No.: 12/978,721

(22) Filed: Dec. 27, 2010

(65) Prior Publication Data

US 2012/0163558 A1 Jun. 28, 2012

(51) Int. Cl.
*H04M 3/42* (2006.01)
*H04M 1/24* (2006.01)
*H04L 12/16* (2006.01)
*H04Q 11/00* (2006.01)
*H04L 12/28* (2006.01)

(52) U.S. Cl.
USPC ............ 379/202.01; 379/1.01; 370/260; 370/395.4; 370/395.42; 455/416

(58) Field of Classification Search
USPC .......... 379/202.01, 1.01, 22.01; 370/352, 370/395.42, 252, 395.4, 260, 241, 249; 709/205, 201, 204; 375/217; 455/518, 455/516, 416
See application file for complete search history.

(56) References Cited

U.S. PATENT DOCUMENTS

| | | | |
|---|---|---|---|
| 6,049,565 A * | 4/2000 | Paradine et al. | 375/217 |
| 6,804,340 B2 | 10/2004 | Howard et al. | |
| 7,801,957 B2 * | 9/2010 | Guo et al. | 709/205 |
| 2003/0110206 A1 * | 6/2003 | Osokine | 709/201 |
| 2005/0089045 A1 * | 4/2005 | Shim et al. | 370/395.42 |
| 2008/0101575 A1 | 5/2008 | Amador et al. | |
| 2009/0054010 A1 * | 2/2009 | Shaffer et al. | 455/90.2 |
| 2010/0265834 A1 * | 10/2010 | Michaelis et al. | 370/252 |
| 2012/0120815 A1 * | 5/2012 | Anderson et al. | 370/252 |

* cited by examiner

*Primary Examiner* — Thjuan K Addy
(74) *Attorney, Agent, or Firm* — Sheridan Ross P.C.

(57) ABSTRACT

When making a decision about who should have control of a voice channel in a teleconference, one exemplary aspect is directed toward a voice switch mechanism that determines and takes into account a latency (such as a round trip latency) of each participant's path to the switch. The switch uses this information to ensure that short-latency paths do not have an unfair advantage over long-latency paths when individuals competitively seek control of the voice channel. Illustratively, if an individual is participating in the path that has a round trip latency of 300 ms or greater than that of other participants, the voice switch creates a level playing field even if it detects voice energy from a short-latency user first by granting control of the channel to the long-latency user if voice energy is detected from that user within 300 ms of the short-latency detection.

24 Claims, 2 Drawing Sheets

LATENCY COMPENSATION ADJUNCT FOR TELECONFERENCE VOICE SWITCHES

FIELD

An exemplary aspect of the invention relates to communications technology. More specifically, an exemplary embodiment is directed toward voice switches and/or bridges. Even more specifically, an exemplary embodiment is directed toward latency compensation in teleconference voice switches.

BACKGROUND

Rather than allow all participants in a teleconference to be heard simultaneously, many teleconference voice switches allow only one person at a time to be heard by the others. In a typical implementation, the voice switch will give control in the voice channel to the first individual that it "hears" speaking after a pause in the conversation. Individuals who are on long-latency connections, e.g., individuals who are overseas or individuals using a cell phone, are at a disadvantage because they hear a pause in the conversation only after it is heard by the people who are on short-latency connections. To make matters worse, even if long-latency and short-latency people begin speaking at exactly the same time, the switch will give control of the audio to the short-latency user because he or she will be identified by the switch as having been first-in-line.

Some teleconferencing systems allow the host to grant control of the audio channel to specific individuals. Furthermore, in some teleconference bridges, it is possible to breakthrough the voice switch by pressing one of the keys on the dial pad. An audio tone will be heard by others on the bridge, alerting them that someone in the conference wishes to speak.

In even further conference environments that support media in addition to voice, such as AVAYAs'® Meeting Exchange, it is possible to signal via a non-voice channel that the ability to speak is being requested. In other teleconference configurations, it is possible to establish a queue that determines the order in which people are permitted to speak.

SUMMARY

However, in teleconference situations that include short-latency and long-latency paths to the bridge or switch, the existing voice switch mechanisms fail to "level the field" between the short-latency and long-latency users in a way that allows the kind of spontaneous give-and-take conversational dynamics that are typical of face-to-face meetings.

When making the decision about who should have control of the voice channel in a teleconference, one exemplary embodiment is directed toward a voice switch mechanism that computes and takes into account the round trip latency of each participant's path to the switch. The switch utilizes this information to ensure that short-latency paths do not have an unfair advantage over long-latency paths when individuals competitively seek control of the voice channel.

Illustratively, if an individual is participating in the path that has a round trip latency of 500 ms or greater than that of other participants, the voice switch creates a level playing field even if it detects voice energy from a short-latency user first by granting control of the channel to the long-latency user if voice energy is detected from that user within 500 ms of the short-latency detection.

Mechanisms such as ping, trace route, and other well known technologies allow the latency for one or more of the paths to the various endpoints to be determined. In accordance with one exemplary embodiment, the latencies of one or more paths are sampled and the switch recalibrated during the call, not just at the start of the call, if there is reason to believe that the relative latencies of the network paths could vary or have varied.

Another exemplary approach that can equalize people's ability to gain control of the channel is for the voice channel to use hysteresis time to determine which of the competing inputs has priority.

In accordance with yet another exemplary embodiment, and even though the idea of user specific preferences is known, one exemplary embodiment offers a novel way to implement the idea. Illustratively, medium-priority users have an artificial X millisecond "handicap" when competing for the voice switch with low-priority users having an X+Y millisecond handicap. A possible implementation of this idea allows the conference moderator, or host, to assign the handicaps on a per-user, per-endpoint, or per-group basis.

Another exemplary implementation assigns and/or varies the handicaps automatically during the call, based on factors such as an individual's level within the organization, a determination by the switch that certain users are dominating the conversation, or a determination by the switch that certain users have been trying to speak but they have been unsuccessful.

Additionally, any one or more of the above techniques can be used in combination, such as the latency and handicap implementations used in conjunction with one another.

Prior techniques to address the above problem require telephone conference participants to be aware of who is on a long-latency connection and to make a deliberate effort to include them in the conversation. Regardless of whether it is realistic to expect conference participants to display the required etiquette, the fundamental problem is that the approaches of prior techniques disrupt the spontaneous give-and-take dynamics that characterize unconstrained conversations. Moreover, prior techniques that give preferential voice switch treatment to high priority users over low priority users do so by allowing the high priority users to interrupt low priority users. These approaches do not impose a time-based handicap in the race for the voice switch.

Accordingly, exemplary aspects are directed toward insuring that people who are on long-latency connections to voice switch-mediated teleconferences and/or users who fail to "jump in" quickly when the voice switch is available, have an equal opportunity to be heard and gain control of the switch/bridge.

In accordance with another exemplary embodiment, a voice switch, which is generally a component of a physical communication device having two or more communication ports and which is configured to switch one or more voice streams received from one of the two or more ports to another of the two or more ports compensates for different latencies on different communications channels.

In accordance with another exemplary embodiment, one or more of a determined latency, hysteresis, and handicaps can be used to assist with ensuring equal ability to secure control of the voice switch/bridge during a communication session.

In accordance with another exemplary embodiment, one or more of the above can be updated one or more times during a communication session, such as a telephone conference or call.

In accordance with yet another exemplary embodiment, information such as caller ID, circuit information, or the like, can be saved with information indicating historically what latency levels have been associated with that particular communications channel. The saved information can be used, for example, upon initiating of a call with the same endpoint to help level the playing field for one or more of the participants. Then, the saved information can optionally be verified by performing a latency check for the channels and adjusting the delay or handicap as needed.

In accordance with another exemplary embodiment, an exemplary aspect is directed toward a method and/or system for latency compensation in a communication environment including determining a latency of one or more communications channels between a switch and an endpoint, assigning a latency compensation value to one or more of the one or more communications channels that has a relatively long latency relative to other channels, wherein the latency compensation value enables a user of an endpoint associated with a longer-latency channel to compete for control of the switch with a user of an endpoint associated with a shorter-latency channel, receiving a first control-request signal on the shorter-latency channel, receiving a second control-request signal on the longer-latency channel subsequent to receiving the first signal, and in response to receiving the second signal within a time of the latency compensation value from receiving the first signal, granting the control of the switch to the endpoint associated with the longer-latency channel.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using server(s), the invention is not limited to use with any particular type of communication system or configuration of system elements. Those skilled in the art will recognize that the disclosed techniques may be used in any communication application in which it is desirable to compensate for latency. Additionally, while certain illustrative embodiments are directed toward certain types of latency, it is to be appreciated that the systems and method herein can be used with one or more other types of latency, such as roundtrip latency, latency from endpoint to switch, latency from switch to endpoint, TCP (Transmission Control Protocol) or UDP (User Datagram Protocol) latency, signaling or media latency, and/or in combination with Quality of Service (QoS) settings that might be employed for the different paths and/or different types of packets.

Figure 1:
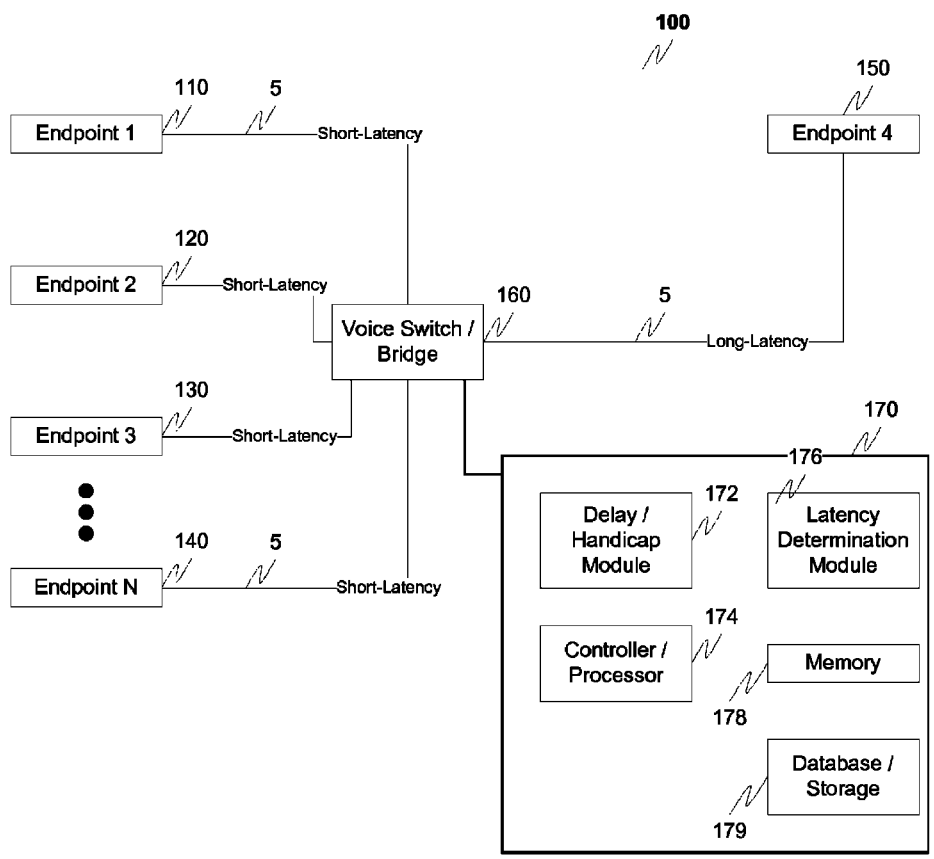
FIG. 1 illustrates an exemplary communications environment.

FIG. 1 shows a communications environment 100 in accordance with at least one embodiment. The communications environment 100 generally comprises a communication network (not shown) for connecting at least two communication devices or endpoints. The communication network generally employs some type of communication switch/server to connect endpoints such as communication devices.

The communication network may comprise any type of information transportation medium and may use any type of protocol(s) to transport messages between endpoints. The communication network may include wired and/or wireless communication technologies. Examples of the communication network include, without limitation, a standard Plain Old Telephone System (POTS), an Integrated Services Digital Network (ISDN), a Public Switched Telephone Network (PSTN), a Local Area Network (LAN), a Wide Area Network (WAN) like the Internet, and any other type of packet-switched or circuit-switched network known in the art.

The communication devices or endpoints may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, SIP-based phones, packet-based traditional computer telephony adjuncts, and conventional wired or wireless telephones.

Each communication device is usually associated with a contact or conference participant. As can be appreciated, the communication network may provide communication capabilities between many more than just two communication devices or endpoints; however, for purposes of illustration and simplicity only four communication devices are shown and described.

In one embodiment, the communication environment may include a switch that may include a private branch exchange (PBX) system or any other type of switching system capable of providing a telephone and/or conference service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call(er or ing) participants, servers and databases. The switching fabric can provide the functionality to direct incoming and/or outgoing calls to various endpoints and further provides for conferencing capabilities between endpoints as well as the ability to forward information associated with presence.

FIG. 1 illustrates an exemplary communications environment 100. In addition to well known components, the communications environment 100 includes one or more endpoints, such as endpoints 1-3, respectively, 110-130, on short-latency channels, and one or more endpoints, such as endpoint 4, 150, on a long-latency channel. The various endpoints are connected via one or more links 5 and network(s) (not shown) to a voice switch/bridge 160. The voice switch/bridge 160 is connected to the latency compensation module 170 with the latency compensation module 170 including a delay/handicap module 172, controller/processor 174, latency determination module 176, memory 178, and database/storage 179. The term communication device, communication endpoint or endpoint as used here in generally refers to any hardware device and/or software operable to engage in a communication session(s). For example, a communication device can be an IP-enabled phone, a desktop phone, a cellular phone, a personal digital assistant, a soft-client telephone program executing on a computer system, and the like. Each of these endpoints is typically used by one or more participants to participate in a communication session, such as a telephone conference or call that is carried or hosted by the voice switch/bridge 160.

In operation, one or more users, utilizing an associated endpoint, establish a communication session via the voice switch/bridge 160. Next, and in cooperation with the latency compensation module 170, one or more of a latency determination, hysteresis, and handicapping are utilized to assist with ensuring equal opportunity to secure control of the voice switch 160 regardless of the latency associated with a particular communications path over which the user is communicating with the switch 160.

Initially, and optionally, a determination can be made as to whether saved settings should be loaded to assist with latency compensation upon initiation of the telephone conference or call. For example, and during one or more prior telephone conferences or calls, information such as caller ID information, path information between the voice bridge 160 and an endpoint, geographic information such as on which continent or in which state an endpoint is located, and the like, can be saved with each of these types of information having an associated latency that has been previously determined. For example, the latency determination module 176 cooperating with memory 178 and database/storage 179, can monitor a plurality of telephone conference channels and the information associated therewith (described above), and record the latencies associated with each of the communications paths.

Thus, when a new telephone conference or call is initiated between an endpoint and the voice switch, this previously determined latency information can optionally be used by the latency determination module 176 to initially control the delay-handicap module 172, ensuring that each participant has equal access to the voice bridge/switch 160. As discussed hereinafter, and as with the other techniques disclosed herein, the latency compensation values can be adjusted one or more times during a communication session, with this information optionally being saved in database 179 and usable for future communications sessions.

Optionally, or in addition to the above, and at any point in time, the latency determination module 176 can determine the latency of one or more of the communication channels. Exemplary technologies used to determine latency include one or more of ping, traceroute, path ping, and the like.

Optionally, or in addition to the above, hysteresis time can be used to determine which competing input should have priority. This can again be done with the cooperation of the latency determination module 176 and processor 174. For example, the hysteresis time can be determined based on one or more of a handoff time between a neighboring cells, involved switches, routing paths or the like. Hysteresis generally refers to systems that have memory, where the effects of the current input (or stimulus) to the system are experienced with a certain lag. While the term has its origin in physics, it has been applied increasingly to digital transmission systems. A hysteresis time (could also be called a waiting period) is a desirable lag time designed into a system such that it does not tail chase between states or conditions. In a deterministic system with no dynamic conditions or hysteresis, it is possible to predict the system's output at an instant in time, given only its input at that instant in time. In a system with hysteresis, this is not possible; there is no way to predict the output without knowing the system's current state, and there is no way to know the system's state without looking at the history of the input. This means that it is necessary to know the path that the input followed before it reached its current value. A desirable hysteresis time can be determined by studying system behavior and ensuring that there is a delay in decision making to avoid tail chasing and becoming an unstable system.

Optionally, or in addition to the above, and with the cooperation of the handicap module 172, an entity, such as conference moderator, can assign a handicap to one or more of the communications channels. This handicap can be assigned based on one or more of known characteristics of the communication channel, importance of the individual(s) at the particular endpoint, rank within an organization, or in general be based on any one or more factors known to the conference moderator.

The delay module 172 then associates an appropriate delay with one or more of the communications channels in cooperation with the voice switch 160 to compensate for the differences in latency. Ideally, the voice switch 160 would like to equalize the latencies between the various communication channels to ensure that each conference participant is given equal access to the bridge; however, as will be appreciated with real-world scenarios, the latencies may not be exactly equal, but are close enough that each conference participant is under the impression they are being given equal access to the bridge.

The delay/handicap module 172 is also capable of updating, in cooperation with the latency determination module 176, the compensation delay associated with one or more of the communication channels at any point in time during the communication session. Additionally, and in cooperation with the memory 178 and database 179, the various latencies associated with the respected communications channels can be saved along with associated information, such as caller ID information, communications path information, and the like, so that these settings may optionally be used for future communication sessions between the bridge and the same endpoint to establish an initial latency compensation value.

Figure 2:
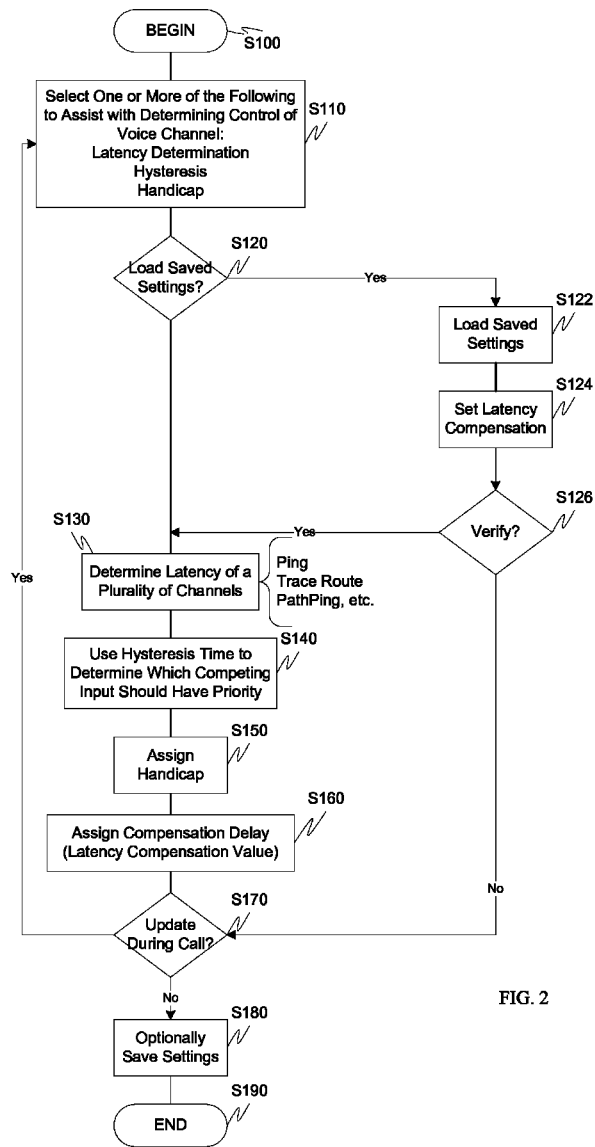
FIG. 2 is a flow chart outlining an exemplary method for latency compensation.

FIG. 2 outlines an exemplary method for latency compensation. In particular, control begins in step S100 and continues to step S110. In step S110, one or more of latency determination, hysteresis time and handicap can be selected to compensate for latency in one or more of the respective communications channels associated with an endpoint. Next, in step S120, a determination is made as to whether saved settings should be loaded such that one or more of the communications channels are assigned an associated delay based on prior-observed communications channel characteristics. If saved settings are to be loaded, control continues to step S122, where the saved settings are loaded and the latency compensation is set in step S124. In step S126, a determination can be made as to whether these said latency compensations should be verified. If a verification is needed, control continues to step S130; otherwise, control jumps to step S170.

In step S130, latency for a plurality of the channels is determined. As discussed, this latency can be determined based on one or more of ping information, trace route information, path information, and the like. Next, in step S140, and either alternatively or in addition to the latency determined in step S130, hysteresis time can be used to determine which of the competing inputs from the various communications channels should have priority. Then, in step S150, and in addition or alternatively to steps S130 and S140, a handicap can be assigned to one or more of the communications channels. This assigned handicap associates a delay with one or more communication channels. As discussed, the assigned delay can be assigned by one or more of the moderator, another conference participant or dynamically, for example based on the ranking or title of an individual associated with a particular endpoint, and/or one or more other criteria. Control then continues to step S170.

In step S170, a determination is made whether the compensation delay for any one or more of the communications channels should be updated during the call or conference. If an update is desired, control jumps back to step S110, with control otherwise continuing to step S180. In step S180, the assigned compensation delays can optionally be saved along with associated information such as caller ID information, endpoint information, communications channel or path information, participant information, or the like. Control then continues to step S190 where the control sequence ends.

In accordance with another exemplary optional embodiment, one or more of the determined latency values, hysteresis times and assigned handicaps can be provided to one or more of the conference participants via an interface, such as a graphical user interface (not shown). The interface can assist the one or more participants with ensuring there is a "level playing field" in terms of competition for control of the voice bridge. The interface can provide the one or more participants with tools to set the latency compensation values for the channels in either a manual manner, semi-manual (for example based on recommended settings determined by the system) and/or can provide the one or more users with insight as to how the system automatically sets the latency compensation values, with the option of modifying them based, for example, on how a communication session is progressing.

In accordance with another exemplary embodiment, one or more of the conference participants are provided with a mechanism, such as a feedback channel, that allows information to be sent to another of the conference participants, such as the moderator. The information sent on this channel can indicate, for example, if one of the participants is having difficulty gaining control of the voice bridge. The information can optionally be displayed on the above-described user interface such that one could see what latency compensation value is currently assigned to the channel of the participant having trouble.

In accordance with another exemplary embodiment, the latency values in the voice switch could be changed by an automatic or semi-automatic process during a teleconference. For example, a user may want to decrease a "conversation hog's" ability to monopolize the conversation. Alternatively or in addition, one may might want to (dynamically) recalibrate the voice switch behavior based on automatic detection of changes in latency that occur during the conference (as might be expected if there are changes in network congestion or if someone on a cell phone is moving from tower to tower).

The various embodiments include components, methods, processes, systems and/or apparatus substantially as depicted and described herein, including various embodiments, sub-combinations, and subsets thereof. Those of skill in the art will understand how to make and use the present invention after understanding the present disclosure. The disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description, for example, various features are grouped together in one or more embodiments for the purpose of streamlining the disclosure. This method of disclosure is not to be interpreted as reflecting an intention that the claimed subject matter requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially affecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for latency compensation in a communication environment. While the embodiments have been described in conjunction with a number of features, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method for latency compensation in a communication environment comprising:
   determining a latency of one or more communications channels between a switch and an endpoint;
   assigning a latency compensation value to one or more of the one or more communications channels that has a relatively long latency relative to other channels, wherein the latency compensation value enables a user of an endpoint associated with a longer-latency channel to compete for control of the switch with a user of an endpoint associated with a shorter-latency channel; and
   assigning a handicap latency value to one or more of the one or more communications channels.

2. The method of claim 1, wherein the determining step includes performing one or more of a ping, a traceroute and path ping.

3. The method of claim 1, further comprising providing an indication of at least one latency compensation value to one or more conference participants via a user interface.

4. The method of claim 1, further comprising using one or more saved latency compensation values to perform the assigning step.

5. The method of claim 4, wherein the one or more saved latency compensation values are based on at least one of a previously determined latency compensation value, caller ID information, geographic information and a previously assigned latency compensation value.

6. The method of claim 1, further comprising saving the assigned latency compensation value.

7. The method of claim 1, wherein the communications channels carry teleconference information, and the latency is one or more of roundtrip latency, latency from the endpoint to the switch, latency from the switch to the endpoint, TCP (Transmission Control Protocol) latency, UDP (User Datagram Protocol) latency, media latency and signaling latency.

8. The method of claim 1, further comprising verifying a saved latency compensation value.

9. A non-transitory computer-readable information storage medium having stored thereon instructions, that if executed by a processor, cause to be performed the steps of claim 1.

10. The method of claim 1, further comprising updating the latency compensation value during a teleconference, wherein the updating is done automatically.

11. The method of claim 1, further comprising:
   receiving a first control-request signal on the shorter-latency channel;
   receiving a second control-request signal on the longer-latency channel subsequent to receiving the first signal; and
   in response to receiving the second signal within a time of the latency compensation value from receiving the first signal, granting the control of the switch to the endpoint associated with the longer-latency channel.

12. A system for latency compensation in a communication environment comprising:
   a latency determination module for determining a latency of one or more communications channels between a switch and an endpoint;
   a delay module for assigning a latency compensation value to one or more of the one or more communications channels, wherein the latency compensation value enables a user of the endpoint associated with a longer-latency endpoint to compete with a user of an endpoint associated with a shorter-latency channel; and
   a handicap module that assigning a handicap latency value to one or more of the one or more communications channels.

13. The system of claim 12, wherein the latency determination module further performs one or more of a ping, a traceroute and path ping.

14. The system of claim 12, wherein an indication of one or more latency compensation values is provided to one or more conference participants via a user interface.

15. The system of claim 12, further comprising a database module capable of using one or more saved latency compensation values to perform the assigning step based on the loaded value.

16. The system of claim 15, wherein the one or more saved latency compensation values are based on at least one of a previously determined latency compensation value, caller ID information, geographic information and a previously assigned latency compensation value.

17. The system of claim 12, further comprising a database module capable of saving the assigned latency compensation values.

18. The system of claim 12, wherein the communications channels carry teleconference information, and the latency is one or more of roundtrip latency, latency from the endpoint to the switch, latency from the switch to the endpoint, TCP (User Datagram Protocol) latency, UDP (User Datagram Protocol) latency, media latency and signaling latency.

19. The system of claim 12, wherein a saved latency compensation value is verified.

20. The system of claim 12, wherein the latency compensation value is updated during a teleconference, wherein the updating is done automatically.

21. The system of claim 12, wherein a first control-request signal is received on the shorter-latency channel, a second control-request signal is received on the longer-latency channel subsequent to receiving the first signal and in response to receiving the second signal within a time of the latency compensation value from receiving the first signal, granting the control of the switch to the endpoint associated with the longer-latency channel.

22. A system for latency compensation in a communication environment comprising:

means for determining a latency of one or more communications channels between a switch and an endpoint;

means for assigning a latency compensation value to one or more of the one or more communications channels, wherein the latency compensation value enables a user of the endpoint associated with a longer-latency endpoint to compete with a user of an endpoint associated with a shorter-latency channel; and means for assigning a handicap latency value to one or more of the one or more communications channels.

23. The method of claim 1, further comprising:

determining a hysteresis time based on a handoff time between neighboring cells, wherein the hysteresis time is used to determine which of the endpoints will have priority.

24. The method of claim 1, wherein the assigned handicap latency value is based on an individual's level within an organization.

* * * * *